United States Patent Office
3,154,150
Patented Oct. 27, 1964

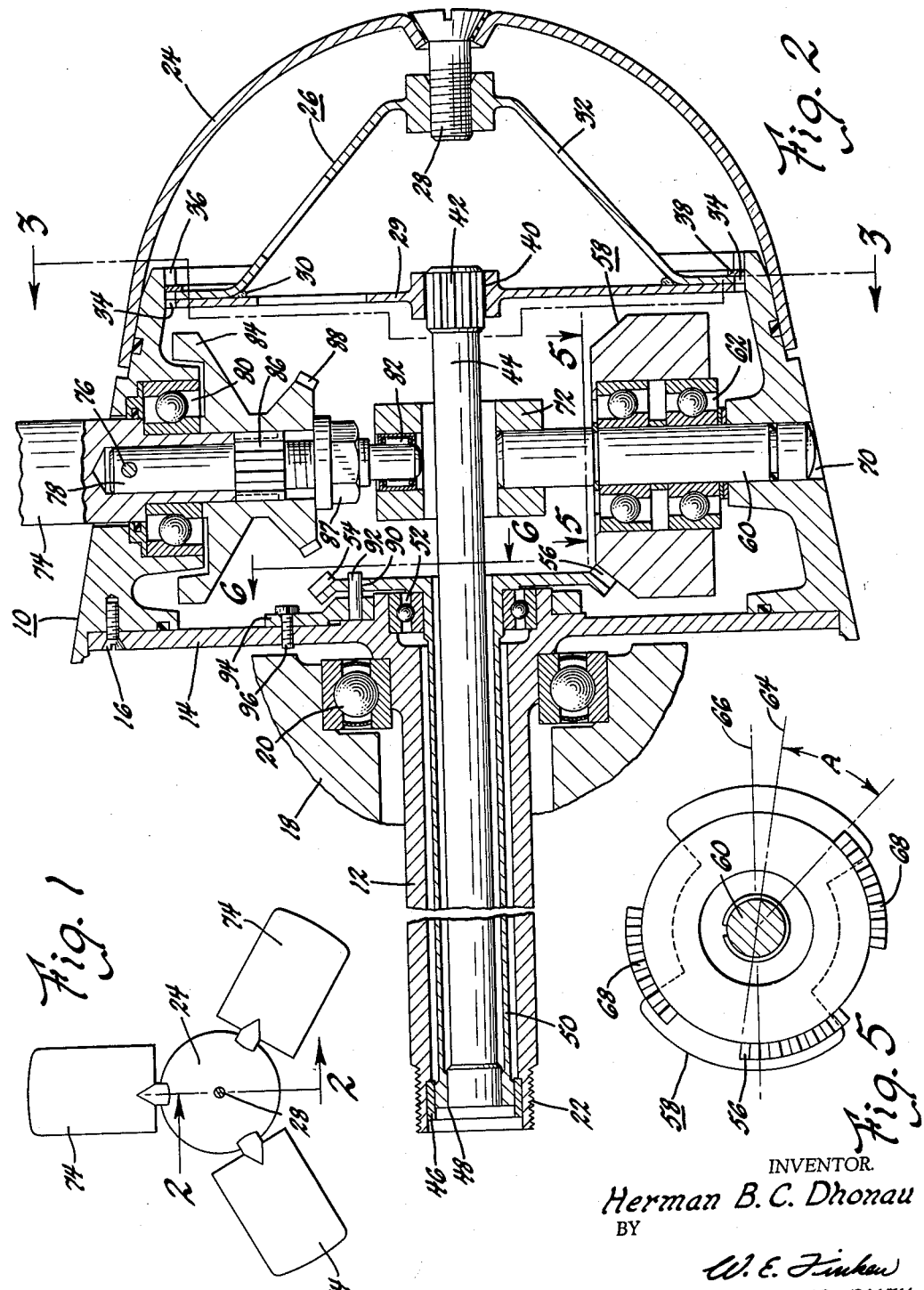

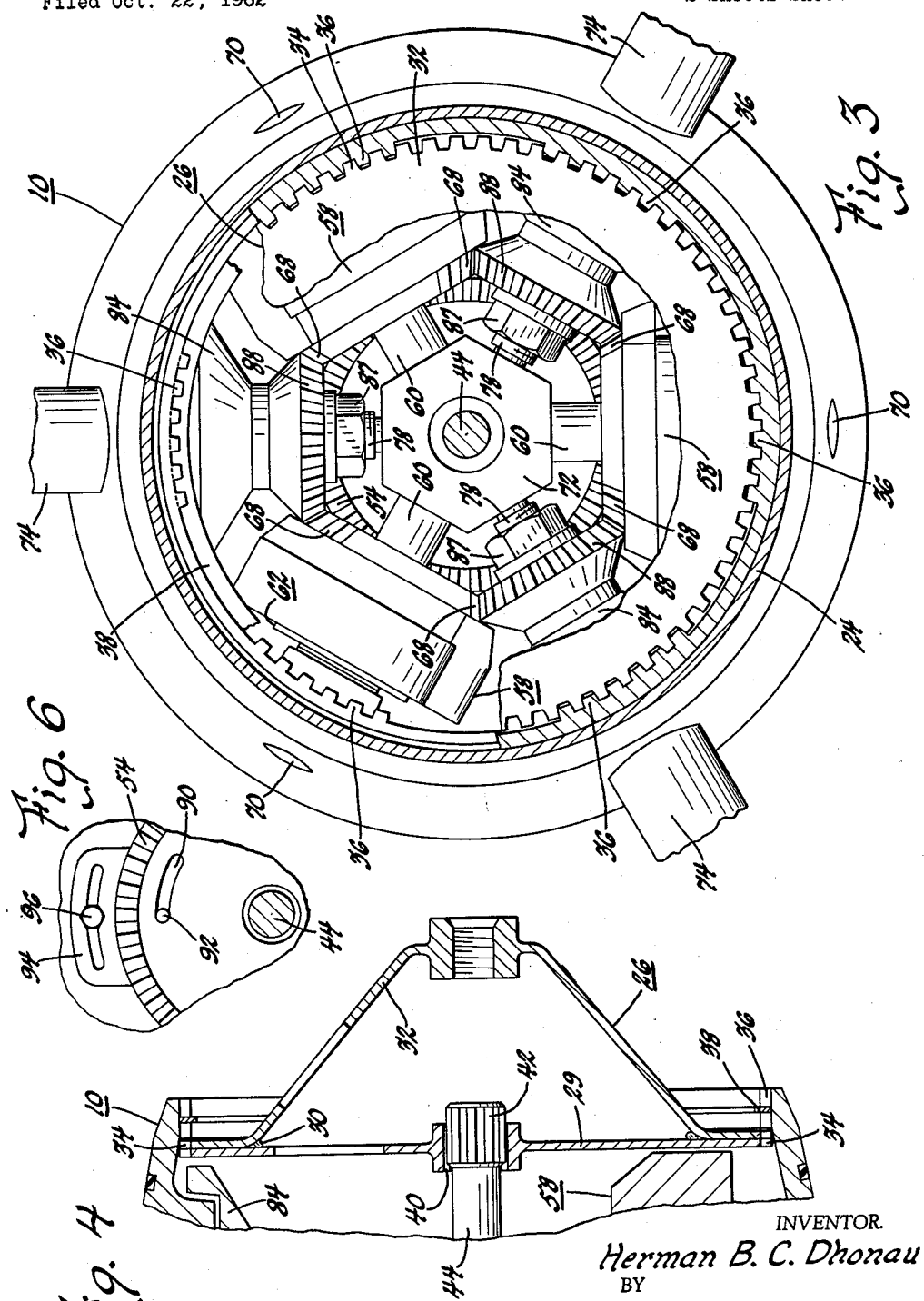

3,154,150
AIR DRIVEN TURBINE
Herman B. C. Dhonau, Indianapolis, Ind., assignor to General Motors Corporation, Detroit, Mich., a corporation of Delaware
Filed Oct. 22, 1962, Ser. No. 231,933
7 Claims. (Cl. 170—68)

This invention pertains to air driven turbines, and particularly to a variable pitch air driven turbine including governing means for maintaining turbine speed within preselected limits.

Heretofore, air driven turbines for use in connection with aircraft to provide emergency power for operating various accessory equipment have embodied a spring-flyweight droop governor of the general type shown in Blackburn Patent No. 3,013,613. Governors of the aforesaid type embody sliders and links, and thus it is necessary to overcome the sliding friction forces of these components during operation thereof. The present invention relates to a governor assembly for an air driven turbine utilizing gears and antifriction bearings to eliminate sliding friction, and a single preloaded torsion bar assembly for opposing pitch changing movement of the turbine blades in response to centrifugal forces acting on the governor flyweights during rotation of the turbine.

Accordingly, among my objects are the provision of an improved governor assembly for an air driven turbine embodying geared connections between centrifugal flyweights and a centrally mounted torsion bar assembly; the further provision of a governor assembly for an air driven turbine wherein the centrifugal flyweights are mounted on radially extending shafts separate from the turbine blade shafts and wherein counterweights are mounted on the blade shafts thus reducing the thrust load on the blade bearings to permit the turbine to be operated at higher speeds; and the still further provision of a governor assembly for an air driven turbine having a centrally mounted torsion bar including means for preloading the torsion bar.

The aforementioned and other objects are accomplished in the present invention by interconnecting the turbine blades and centrifugal flyweights through gearing, and connecting the flyweights and the torsion bar through gearing. Specifically, the improved air driven turbine comprises a hub having three equiangularly spaced adjustable pitch blades journalled therein. A floating bearing block is supported centrally of the hub by three equiangularly spaced flyweight shafts which are disposed between the turbine blades. Each blade shaft carries a counterweight which has geared connections to adjacent centrifugal flyweights. The centrifugal flyweights are in turn geared to a centrally mounted torsion bar assembly. The torsion bar assembly can be preloaded by disengaging a frame member from the hub and thereafter reengaging the frame member with the hub to retain the preloading.

Further objects and advantages of the present invention will be apparent from the following description, reference being had to the accompanying drawings, wherein a preferred embodiment of the present invention is clearly shown.

In the drawings:

FIGURE 1 is a front view, in elevation, of an air driven turbine constructed according to the present invention.

FIGURE 2 is an enlarged fragmentary view, partly in section and partly in elevation, with certain parts broken away, taken along line 2—2 of FIGURE 1, with the blades at the low pitch stop position.

FIGURE 3 is a view, partly in section and partly in elevation, with certain parts broken away, taken along line 3—3 of FIGURE 2.

FIGURE 4 is a fragmentary sectional view depicting the manner in which the torsion bar assembly is preloaded.

FIGURE 5 is a view, partly in section and partly in elevation, taken along line 5—5 of FIGURE 2.

FIGURE 6 is a fragmentary view, partly in section and partly in elevation, taken along line 6—6 of FIGURE 2.

With reference to FIGURES 1 and 2, the improved air driven turbine comprises a hub 10 having a hollow hub shaft 12 with a flanged forward end 14 secured thereto by a plurality of bolts 16. The hub shaft 12 is journalled for rotation relative to a fixed support 18 by a combined radial and thrust ball bearing assembly 20. The rearward end of the hub shaft 12 is externally threaded at 22 whereby it may be drivingly connected to a suitable accessory, such as a pump or a generator. The forward portion of the hollow hub 10 is closed by a substantially parabolic nose cover, or spinner, 24 which is secured to a spider-like frame 26 by a bolt 28. The hub unit can be partially filled with oil, if desired, since all joints include seals, as shown. The frame 26 comprises a perforate disc member 29 which is brazed at 30 to a perforate frusto conical member 32, the outer peripheral portions of the members 29 and 32 having a full circumferential set of straight spline teeth 34 engageable with angularly spaced sets of straight spline teeth 36 formed on a forwardly projecting portion of the hub 10. The frame 26 is adapted to engage a snap ring 38 which limits forward movement thereof when the bolt 28 is tightened.

An inner sleeve portion of the disc member 29 is formed with a set of straight spline teeth 40 which engage a set of straight spline teeth 42 on the end of a torsion bar 44 that extends coaxially into the hollow hub shaft 12. The rearward end of the torsion bar 44 is journalled by a sleeve bearing 46 in the hollow hub shaft, and is brazed at 48 to a tube 50 coaxial with the bar 44 and spaced radially therefrom. The torsion bar 44 and the tube 50 constitute an elongate torsion bar assembly for opposing movement of centrifugal flyweights as will be pointed out more particularly hereinafter.

To this end, the forward portion of the tube 50 is journalled by a ball bearing assembly 52 in the flange portion 14 of the hub shaft 12 and is formed with an integral bevel gear 54. As seen in FIGURE 2, the bevel gear 54 meshes with a bevel gear sector 56, there being a slight reduction between sector 56 and gear 54. The bevel gear sector 56 is formed on the periphery of a centrifugal flyweight 58, as shown in FIGURE 5. The turbine includes three centrifugal flyweights 58 as seen in FIGURE 3, which are journalled for rotation about stub shaft 60 by combined radial and ball bearing assemblies 62. The flyweights 58 have substantially equal masses located diametrically on opposite sides of their axes of rotation, and operate throughout a 35° angle A, as depicted in FIGURE 5. At the low pitch stop position, the centerline 64 of each flyweight is located 10° from a line 66 parallel to the axis of the hub shaft 12, and at the high pitch stop position the centerline 64 is located 45° from the line 66. This arrangement is utilized since flyweight torque is a sine wave function and is a maximum at the 45° position alluded to hereinbefore. The flyweight 58 also includes diametrically located peripheral bevel gear sectors 68, the purpose of which will be pointed out hereinafter. The stub shafts 60 have their outer ends press fitted in openings 70 in the hub 10, and have their inner ends piloted in a floating bearing block 72 mounted centrally of the hollow hub 10.

Three equiangularly spaced adjustable pitch blades 74 extend radially outward from the hub, each blade 74 being pinned at 76 to a stub shaft 78 journalled in the hub by a combined radial and thrust ball bearing assembly 80. The inner ends of the stub shafts 78 are journalled by needle bearing assemblies 82 in the floating bearing block 27. The floating bearing block 72 is located by the stub shafts 60 supporting the centrifugal flyweights 58, it being noted that the three stub shafts 60 are equiangularly spaced and located between the blade supporting shafts 78.

Each blade supporting shaft 78 has a counterweight 84 connected thereto by splines at 86 and held against radial movement by a nut 87. The function of the counterweights 84, which likewise have properly oriented substantially equal masses disposed on opposite sides of their axes of rotation, is to balance out the centrifugal twisting moment forces of each turbine blade 74. The centrifugal twisting moment forces to which the turbine blades are subjected during rotation of the hub 10 tend to effect rotation of the turbine blades about their longitudinal axes and thus interfere with governor stability. The counterweights 84 are formed with integral bevel gears 88 which mesh with the bevel gear sectors 68 on the centrifugal flyweights 58.

A fifty to thirty-five gear reduction is effected between the bevel gears 88 and the bevel gear sectors 68. The turbine blades 74 have an excursion angle, or a pitch changing angle, of 50°. With the aforesaid reduction between the gears 88 and sectors 68, the centrifugal flyweights 58 thus operate through a range of 35°, the masses of the flyweights being so oriented that the torques developed thereby are a maximum when the blades 74 are at their high pitch stop position, or, stated another way, when the blades have their lowest angle of attack. As seen in FIGURE 6, the bevel gear 54 has an elongate arcuate slot 90 through which a pin 92 extends. The pin 92 is attached to an adjustable plate 94 bolted to the hub at 96. The pin 92 engages the end of the slot 90 as shown in FIGURE 6 at the low, or flat, pitch position of the blades 74, and the other end of the slot 90 at the maximum pitch position of the blades.

Referring particularly to FIGURE 4, the torsion bar assembly comprising the bar 44 and the tube 50 has an operating range of approximately 30°, thus requiring the aforementioned reduction between the bevel gear sectors 56 and the bevel gear 54. The torsion bar assembly is preloaded by an initial 10° windup, and this is readily achieved in the present invention by disengaging the frame 26 from the hub 10 as depicted in FIGURE 4. Thus, the bolt 28 is removed as is the spinner 24, after which the frame 26 is pushed rearwardly to disengage the spline teeth 34 from the spline teeth 36. Since the frame member 28 has splined engagement with the torsion bar 44 by virtue of interengaging straight spline teeth 40 and 42, rotation of the frame 26 will twist the torsion bar 44 to preload the torsion bar assembly and this preloading is retained by reengaging the spline teeth 34 of the frame with the spline teeth 36 on the hub. Thereafter, the spinner 24 is attached to the frame 26 by the bolt 28 so as to maintain the preload on the torsion bar assembly by preventing disengagement of the frame 26 from the spline teeth 36 on the hub.

Operation of the improved air driven turbine is as follows: When the air driven turbine is withdrawn from a moving air stream, the torsion bar assembly comprising the bar 44 and the tube 50 will rotate the flyweights 58 and the counterweights 84, thus rotating the blades 74 to their minimum pitch position, or to a position of maximum angle of attack. When the turbine is projected into a moving air stream, rotation will be imparted to the hub 10. During rotation of the hub 10 all of the components carried thereby including the counterweights 84, the flyweights 58, and the torsion bar assembly rotate therewith. As the rotational speed of the hub 10 increases, the centrifugal flyweights 58 tend to rotate about their radial axes, which rotation is resisted by the preloaded torsion bar assembly. When the centrifugal torque created by the flyweights 58 overcomes the preload of the torsion bar assembly, the blades 74 will have their pitch changed through gears 68 and 88 so as to decrease their angle of attack and thus decrease the rotational force applied to the blades by the moving air stream. Pitch changing movement of the blades 74 will continue until the opposing forces of the torsion bar assembly and the torque of the centrifugal flyweights are in equilibrium. Conversely, if the turbine is rotating at a predetermined speed and either the load increases or the velocity of the air stream decreases, the torsion bar assembly will overcome the torque created by the centrifugal flyweights so as to decrease the pitch of the blades 74, or increase their angle of attack.

While the embodiment of the invention as herein disclosed constitutes a preferred form, it is to be understood that other forms might be adopted.

What is claimed is as follows:

1. An air driven turbine including, a rotatable hub, a plurality of radially extending blades journalled in said hub for pitch adjustment, a plurality of centrifugal flyweights equal in number to the number of said blades, a radially extending shaft in said hub for rotatably supporting each flyweight, motion transmitting means between said blades and said flyweights, a single centrally mounted, preloaded torsion bar assembly disposed in said hub, motion transmitting means between said torsion bar assembly and said centrifugal flyweights for opposing movement of said centrifugal flyweights during rotation of said hub, and means having splined engagement with said torsion bar assembly and said hub and disengageable from said hub for preloading said torsion bar assembly.

2. An air driven turbine including, a rotatable hub having a centrally disposed hollow hub shaft, a plurality of blades journalled in said hub for pitch adjustment, a counterweight operatively connected to each blade within said hub, each counterweight having a geared peripheral portion, a plurality of centrifugal flyweights, equal in number to the number of said blades, journalled in said hub for rotation about axes extending radially of said hub and having peripheral gear portions meshing with the geared peripheral portions of said counterweights, a single elongate torsion bar assembly mounted coaxially of said hollow hub shaft and having a gear portion meshing with the peripheral gear portions of said centrifugal flyweights for opposing movement of said centrifugal flyweights during rotation of said hub, and means having splined engagement with said torsion bar assembly and said hub and disengageable from said hub for preloading said torsion bar assembly.

3. An air driven turbine including, a rotatable hub, a plurality of radially extending blades journalled in said hub for pitch adjustment, a plurality of centrifugal flyweights equal in number to the number of said blades, a radially extending shaft in said hub for rotatably supporting each flyweight, geared connections between said blades and said flyweights, a single centrally mounted preloaded torsion bar assembly disposed in said hub, geared connections between said torsion bar assembly and said flyweights for opposing movement of said flyweights during rotation of said hub so as to control the pitch position of said blades, means having splined engagement with said torsion bar assembly and said hub and disengageable from said hub for preloading said torsion bar assembly, and a spinner enclosing the forward portion of said hub and removably attached to said last recited means to preclude its disengagement from said hub to maintain the preload on said torsion bar assembly.

4. An air driven turbine including, a rotatable hub, a plurality of radially extending blades journalled in said hub for pitch adjustment, a plurality of centrifugal flyweights equal in number to the number of said blades, a radially extending shaft in said hub for rotatably supporting each flyweight, geared connections between said blades and said flyweights, a single centrally mounted preloaded torsion bar assembly disposed in said hub, geared connections between said torsion bar assembly and said flyweights for opposing movement of said flyweights during rotation of said hub so as to control the pitch position of said blades, a frame having splined engagement with said torsion bar assembly and said hub and disengageable from said hub for preloading said torsion bar assembly, a spinner for enclosing the forward portion of said hub, and removable bolt means for attaching said spinner to said frame to prevent disengagement of the frame from said hub so as to maintain the preload on said torsion bar assembly.

5. The air driven turbine set forth in claim 4 wherein said torsion bar assembly comprises an axially extending bar having a straight spline portion at its forward end and a tube coaxial with said bar and radially spaced therefrom, said tube being rigidly connected to said bar at its rearward end and having a geared connection with said flyweights.

6. An air driven turbine including, a rotatable hub having a centrally disposed hollow hub shaft, a plurality of radially extending blades journalled in said hub for pitch adjustment, a radially extending blade shaft connected to each blade, a plurality of centrifugal flyweights equal in number to the number of said blades, a radially extending stub shaft in said hub for rotatably supporting each flyweight, said stub shafts being equiangularly spaced between said blade shafts, a floating bearing block disposed centrally of said hub and supported by the inner ends of said stub shafts, bearing means in said bearing block for rotatably journalling the inner end of each blade shaft therein, geared connections between said blades and said flyweights, and a single elongate torsion bar assembly mounted coaxially of said hollow hub shaft and having a geared connection with said flyweights for opposing movement of said flyweights so as to control the pitch position of said blades during rotation of said hub.

7. An air driven turbine including, a rotatable hub having a centrally disposed hollow hub shaft, a plurality of radially extending blades journalled in said hub for pitch adjustment, a radially extending blade shaft connected to each blade, a plurality of centrifugal flyweights equal in number to the number of said blades, a radially extending stub shaft in said hub for rotatably supporting each flyweight, said stub shafts being equiangularly spaced between said blade shafts, a floating bearing block disposed centrally of said hub and supported by the inner ends of said stub shafts, bearing means in said bearing block for rotatably journalling the inner end of each blade shaft therein, a counterweight attached to each blade shaft, geared connections between said counterweights and said flyweights, a single elongate preloaded torsion bar assembly mounted coaxially of said hollow hub shaft, and geared connections between said torsion bar assembly and said flyweights for opposing movement of said flyweights during rotation of said hub so as to control the pitch position of said blades.

References Cited in the file of this patent
UNITED STATES PATENTS
2,777,524     Chapman et al. _____ Jan. 15, 1957